United States Patent
McGowan et al.

(10) Patent No.: US 8,715,560 B2
(45) Date of Patent: May 6, 2014

(54) METHOD TO CONTROL THICKNESS IN COMPOSITE PARTS CURED ON CLOSED ANGLE TOOL

(75) Inventors: Eva V. McGowan, Seattle, WA (US); Grant C. Zenkner, Puyallup, WA (US)

(73) Assignee: The Boeing Company, Chicago, IL (US)

(*) Notice: Subject to any disclaimer, the term of this patent is extended or adjusted under 35 U.S.C. 154(b) by 1916 days.

(21) Appl. No.: 11/164,103

(22) Filed: Nov. 10, 2005

(65) Prior Publication Data

US 2007/0102839 A1    May 10, 2007

(51) Int. Cl.
    B29C 70/34    (2006.01)
    B29C 70/44    (2006.01)

(52) U.S. Cl.
    USPC .......... 264/511; 264/550; 264/552; 264/553; 156/286

(58) Field of Classification Search
    None
    See application file for complete search history.

(56) References Cited

U.S. PATENT DOCUMENTS

| | | | | |
|---|---|---|---|---|
| 4,216,047 A * | 8/1980 | Hilliard et al. | | 156/285 |
| 4,608,220 A * | 8/1986 | Caldwell et al. | | 264/510 |
| 5,123,985 A * | 6/1992 | Evans et al. | | 156/213 |
| 6,178,562 B1 * | 1/2001 | Elkins | | 2/458 |
| 6,521,296 B1 * | 2/2003 | Seal et al. | | 427/294 |
| 7,306,450 B2 * | 12/2007 | Hanson | | 425/383 |
| 2003/0183331 A1 * | 10/2003 | Ciambrone et al. | | 156/285 |

* cited by examiner

*Primary Examiner* — Barbara J Musser
(74) *Attorney, Agent, or Firm* — Ostrager Chong Flaherty & Broitman P.C.

(57) ABSTRACT

The present invention provides a method for controlling the thickness of composite laminates cured on closed angle tools. The invention utilizes a peel ply rather than a breather during the preparation for cure of laminate parts having a substantially uniform initial thickness. This method allows composite parts to be formed with greater uniformity and without the need for extra hardware. The composite part formed by the above method may find use in a wide variety of applications, including, for example, automotive and aerospace applications. Thus, for example, a composite part formed in accordance with the present invention is ideally suited for use as a shear tie in a commercial aircraft, which are used to secure the inner framework of the aircraft to the airplane skin.

22 Claims, 6 Drawing Sheets

METHOD TO CONTROL THICKNESS IN COMPOSITE PARTS CURED ON CLOSED ANGLE TOOL

TECHNICAL FIELD

The present disclosure generally relates to preparation of shaped composite materials and more specifically to a method for controlling the thickness of composite parts formed on a closed angle tool.

BACKGROUND ART

Cured laminate composite parts may conventionally be formed from preimpregnated ("prepreg") tape of epoxy and carbon or glass fiber. The prepreg plies are shaped (i.e. bent or curved) and applied to a female curing tool. Conventional processing on female cure tools produces out of tolerance laminate thickness conditions with radii that are thicker than nominal regions. Excessive thickening in the radius beyond the allowable thickness tolerance produces two main problems. First, there will either be large resin pockets between a few plies or the resin layers between many plies will be thicker than normal. Second, fasteners, which need to be located near the inner radius of the shear tie, will be hindered if the thickness of the radius region encroaches on the web or the flange.

Thus, recently, there have been methods developed to control within tolerance the thickness of the entire cured laminate, including the area through the radii. For instance, one method, known as radius pressure intensifying ("RPI"), has been proposed. RPI is a process in which a corner block is coupled against the inner radius of an uncured laminate material. A pressurized bladder is introduced between the block and a larger heated tooling and inflated to a desired pressure essentially preconsolidating the radius under heat and pressure. The RPI is then removed from the part and the laminate part is then bag finished and cured as usual. While RPI can achieve parts having substantially uniform thicknesses, there are disadvantages in utilizing the RPI process. For example, RPI requires unique tooling, the need for a pressurized air supply, and a heated cure tool in order to work. Further, if the laminate part is cycled multiple times utilizing the RPI method, the thickness of the inner radii may be thinned, thus affecting the uniformity of thickness of the part.

Another method for uniformly controlling the thickness utilizes various forms of soft or hard cauls to control the thickness through the radii. However, the use of cauls may cause bulges or thinner areas outside the allowable tolerances in the web and flange. Even if this problem is overcome the fabrication, handling, maintenance, and periodic replacement of the many different cauls would be cost prohibitive.

There thus exists a need to provide a method that controls the thickness, or gage, of the cured laminate material to a substantially uniform thickness along the entirety of its curved and noncurved regions that overcomes the above problems. These uniformly thick and curved composite parts would find application in a wide variety of different commercial applications. For example, these parts would find application in the aerospace and automotive industry for parts requiring specific performance properties and having tight tolerance requirements.

SUMMARY

The present disclosure provides a method for controlling the thickness of composite laminates cured on closed angle tools. The disclosed methods utilizes a peel ply rather than a breather during the preparation for cure of laminate parts having uniform initial thicknesses. This method allows composite parts to be formed with greater uniformity and without the need for extra hardware.

The composite part formed by the above method may find use in a wide variety of applications, including, for example, automotive and aerospace applications. Thus, for example, one example of a composite part formed in accordance with the present disclosure is ideally suited for use as a shear tie in a commercial aircraft, which are used to secure the inner framework of the aircraft to the airplane skin.

Other features, benefits and advantages of the present disclosure will become apparent from the following detailed description, when viewed in accordance with the attached drawings and appended claims.

BEST MODES

The present disclosure provides a method of forming a composite prepreg material into a closed angle shape and processing the material in a manner that results in a cured component that is consistent throughout its thickness. The present disclosure finds applicable uses in a wide variety of potential applications, including for example, in the aerospace and automotive industry. The preferred method of the present disclosure is ideally suited for forming a composite shear tie 32 that is utilized in the supporting framework of a commercial aircraft. A method for forming a shear tie, as one illustrative non-limiting example of a potential end use, will be described further herein below in FIGS. 1-3 and 5-11.

Figure 1:
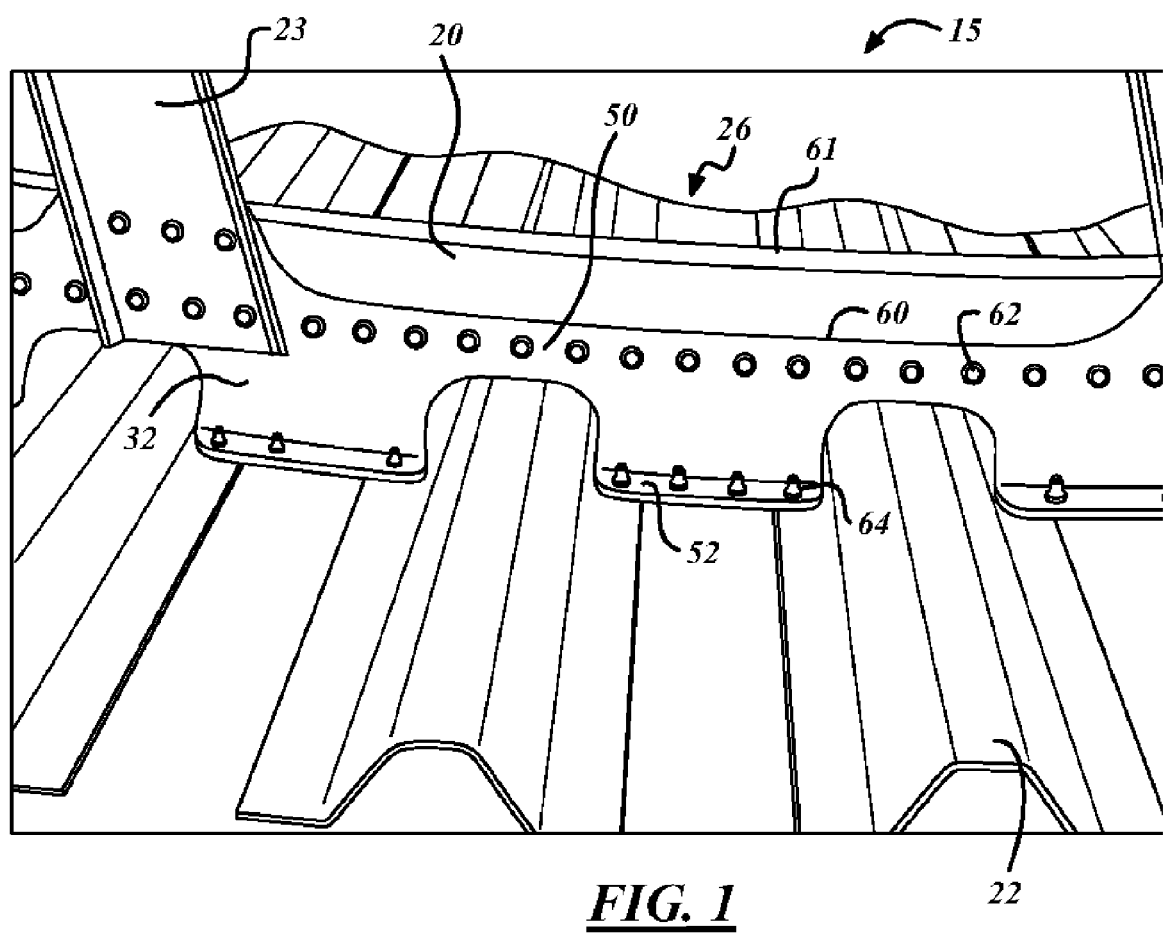
FIG. 1 is a partial view of an aircraft fuselage generally illustrating the construction thereof.
Figure 2:
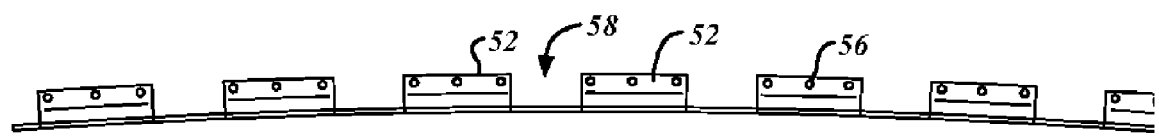
FIG. 2 is a perspective view of the shear tie of FIG. 1 according to a preferred embodiment.

Referring to FIGS. 1 and 2, a perspective and partial view of an aircraft fuselage 15, the construction thereof may be observed to consist of a support frame structure 26 that includes a series of spaced circumferential frame members 20 that define the overall cross sectional shape of the aircraft with a series of spaced stringers 22 that run between adjacent circumferential frame members 20. Stringers 22 run substantially parallel to the longitudinal axis of the aircraft fuselage 15 (i.e. from the front of the plane to the back of the plane) while the frame members 20 are substantially transverse to the longitudinal axis of the fuselage 15. An aircraft skin 28 is coupled around support frame assembly structure 26 and is preferably co-cured to the stringers 22. In addition, the support frame structure 26 also includes a series of support beams 23 run substantially perpendicular to both the frame members 20 and stringers 22 and are fastened to the respective circumferential frame members 20 using a series of fasteners.

Figure 3:
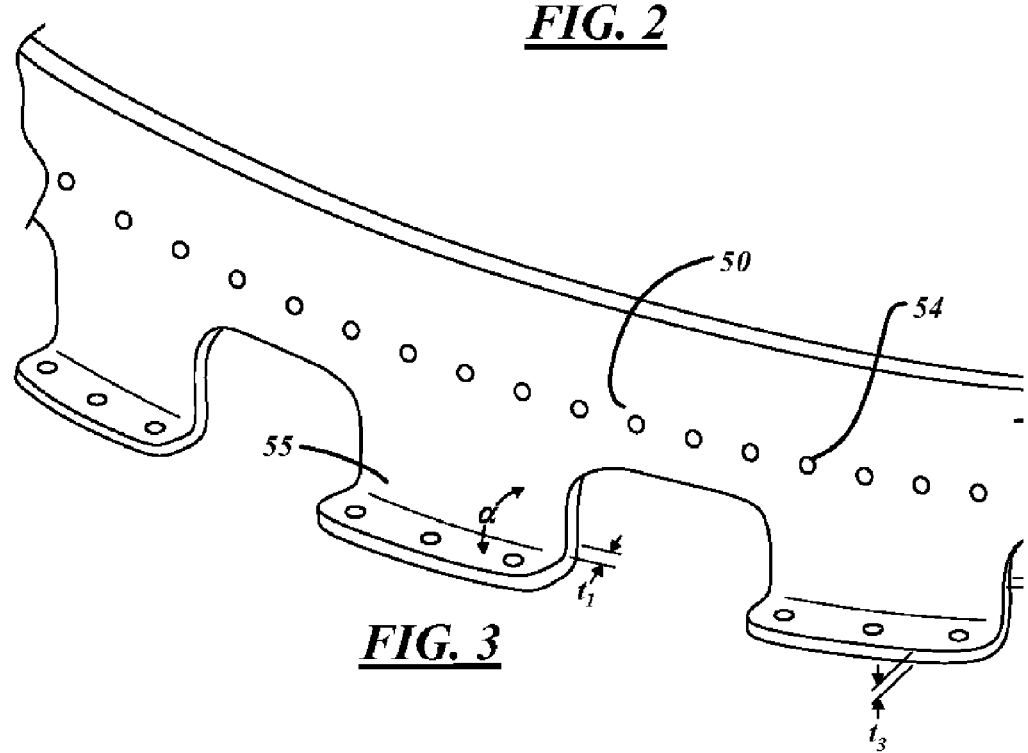
FIG. 3 is another perspective view of the shear tie of FIG. 2.

Also shown in FIGS. 1-3 are a series of shear ties 32 that are used to secure the aircraft skin 28 to the frame members 20 of the fuselage 15. Each shear tie 32 includes a web region 50 and a plurality of curved flanges 52, otherwise known as tabs 52. Each web region 50 preferably includes a series of fastening holes 54. Each tab 52 preferably includes one or more fastening holes 56 and is separated from the next respective tab 52 by a mouse hole region 58. The web region 50 may optionally include a upwardly extending region 61 along a portion of its length in areas that are to be coupled between the respective frame members 20 and support beams 23 and can include a portion of the afore-mentioned fastening holes 54 The fastening holes 54, 56 are introduced to the shear tie 32 in some type of post-production processing well known to those of ordinary skill in the art.

As best shown in FIG. 3, each tab 52 is bent during processing to a respective angle α with respect to the web region 50 and therein defines an inner radius 55 between each respective tab 52 and the web region 50. The angle α is set such that the tab 52 substantially abuts its respective stringer 22 while the web region 50 substantially abuts its respective frame member 20 and is typically about 90 degrees, although in alternative embodiments the angle α may be anywhere between about 0 degrees and 180 degrees, and more preferably between about 60 and 120 degrees. In addition, the thickness t1 of the inner radius 55 within +/−10% of nominal (i.e. the thickness of the part prior to bending), while the thickness t2 of the web region 50 and the thickness t3 of the tab 52 are maintained within +/−6% of nominal.

The shear ties 32 are preferably formed of one or more plies of an epoxy prepreg material that is shaped and curved to conform the outer shape of the fuselage 15 and to the respective frame members 20 and stringers 22. Each ply of the epoxy prepreg material consists of carbon fibers impregnated within an epoxy resin formed by conventional methods well known to those of ordinary skill in the art. The epoxy prepreg is usually preformed as a flat layered material and stored in a frozen and uncured state prior to use. The flat prepreg is subsequently thawed, shaped and cured by the preferred method described below generally in FIG. 4, in conjunction with FIGS. 5-11.

As best shown in FIG. 1, each respective shear tie 32 is fastened to a respective frame member 20 through the fastening holes 54 using a fastener 62 such that the respective mouse hole region 58 extend over the respective stringers 22 and such that the curvature of a backside edge 60 of the web region 50 runs substantially parallel to the inner curve 61 of the frame member 20 between the respective support beams 23. In addition, the shear ties 32 are also preferably fastened between the respective frame members 20 and support beams 23 using one or more additional fasteners 67. The tabs 52 are fastened to the airplane skin 28 by coupling a fastener 64 through a respective fastening hole 56. Alternatively, the shear tie 32 may also secured to the frame member 20, the support beams 23 and to the skin 28 utilizing an adhesive and without the need for fasteners 62, 64 and the respective fastening holes 54, 56.

Figure 4:
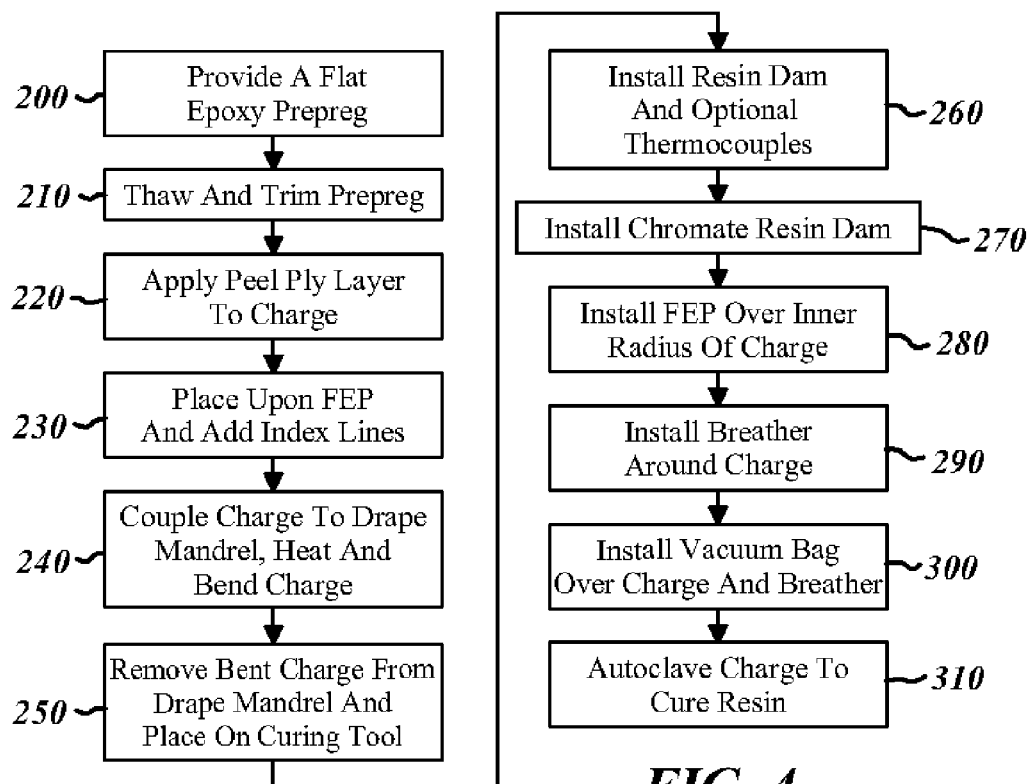
FIG. 4 is a logic flow diagram for forming the shear ties of FIGS. 1-3.

Referring now to FIG. 4, a method for forming a composite material in general, and a shear tie 32 in particular, is described in which the thickness of the radius region is maintained within +/−10% of nominal, while maintaining the non-bent regions within +/−6% of nominal. Maintaining a consistent thickness is important in particular to a shear tie 32 for an aircraft. Further, maintaining a consistent thickness is important during assembly fit up to facilitate other parts nesting into this region.

Referring now to Step 200 in FIG. 4, a flat epoxy prepreg member of a desired thickness is formed by conventional methods. Typically, prior to use, the prepreg member 80 is frozen or otherwise maintained in a substantially uncured state. For a prepreg material (shown as 80 in FIGS. 5-6) that will be used to form a shear tie 32 as shown in FIGS. 1-3, the flat epoxy prepreg 80 consists of one of more layers (or "plies") of carbon fiber impregnated with a 350-degree Fahrenheit cure thermosetting epoxy resin.

However, other thermosetting resins may be utilized in forming prepreg members used in alternative applications. For example, other thermosetting resins that may be utilized include unsaturated polyester resins, aminoresins, alkyd resins, phenolic resins, (meth)acrylated oligomers, silicone resins, and other resins systems that become thermosetting in the presence of a crosslinking resin such as polyurethane-isocyanate systems. Further, depending upon the desired characteristics of the laminated material, lower curing temperature versions of the thermosetting epoxy resin may be utilized such as a 250-degree Fahrenheit curing thermosetting epoxy resin. In addition, as one of ordinary skill recognizes, mixtures of the above-listed thermosetting resins may also be utilized.

In addition, other fibrous materials in addition to carbon fibers may also be utilized and fall within the spirit of the present disclosure. For example, glass fibers such as e-type or s-type glass of various compositions and radial thicknesses may also be utilized.

Next, in Step 210, the flat epoxy prepreg 80 is cut into desired pattern for manufacture to introduce the various features of the composite part in flat form. For a shear tie 32 as in FIGS. 1-3, this includes the tabs 52, the mouse hole regions 58, the web regions 50, as well as shaping curvatures in the backside 60 and front side 53, as shown best in their final form in FIGS. 2 and 3.

In Step 220, a peel ply layer 82 is applied to one side of the thawed charge 80 and trimmed to match the contours of the charge 80. To assist in peel ply removal, an insert approved tape tab 84, such as a 1-inch piece of Teflon tape, is preferably coupled over the peel ply layer 82 along the lower edge 60 of the charge 80.

In Step 230, the charge 80 is placed upon two layers of FEP 86 (a polymer film formed of tetrafluoroethylene and hexafluoropropylene) that are each cut in the approximate shape of the prepreg charge 80 such that the prepreg charge 80 is between the peel ply layer 82 and the FEP layers 86. For a shear tie 32, the mousehole regions 87 are then cut out of the FEP 86, preferably using an X-shape cut 87. Indexing lines 88 are drawn on the prepreg charge 80 for alignment purposes.

Figure 6:
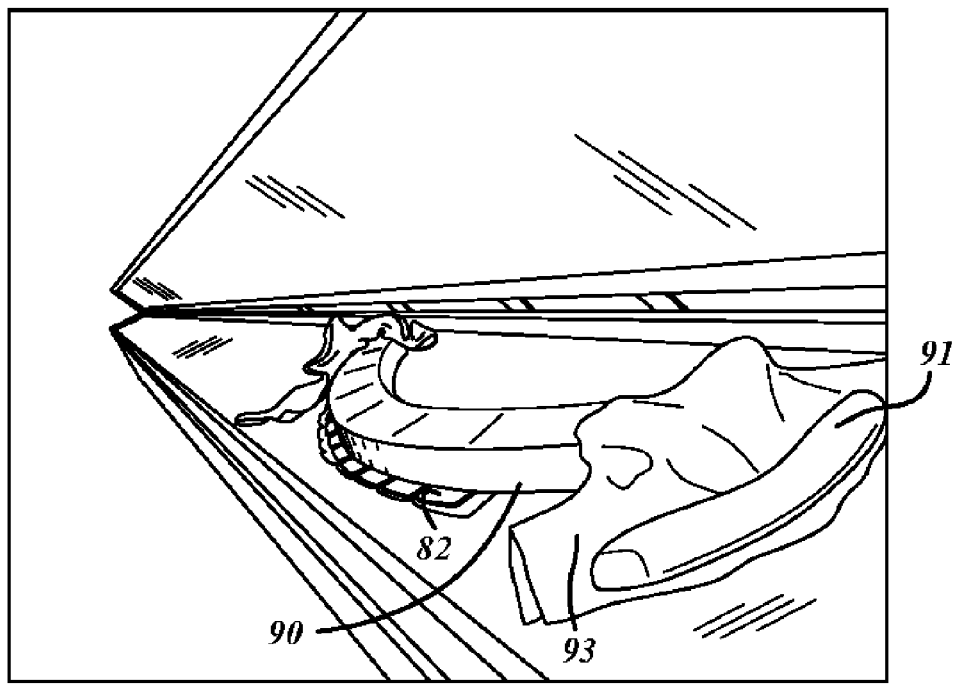
Figure 7:
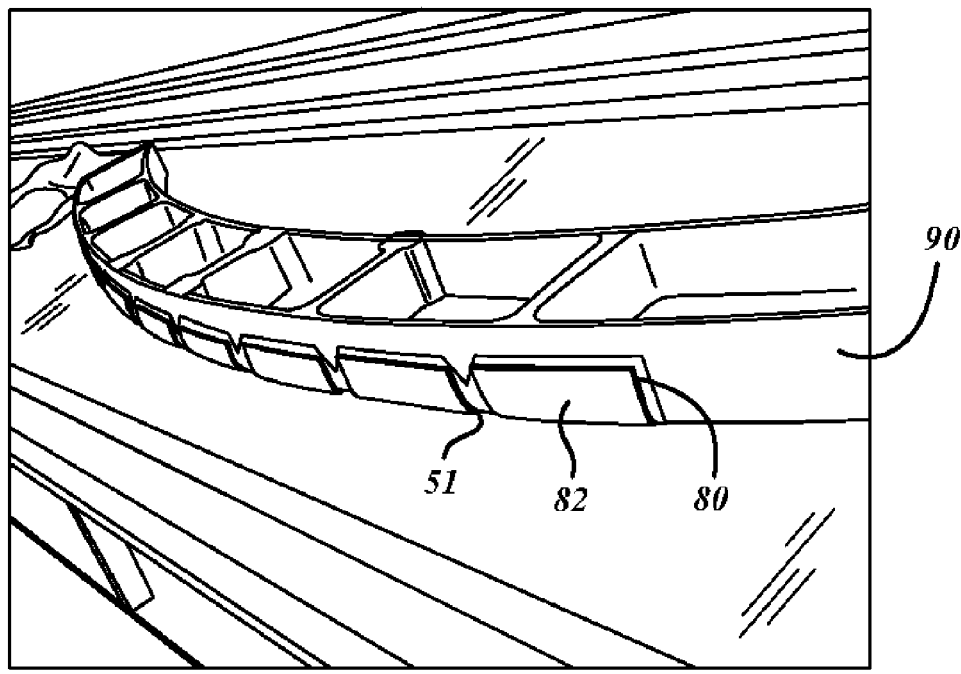

In Step 240, and as shown in FIG. 6, a drape mandrel 90 is placed onto the prepreg charge 80 such that the peel ply layer 82 contacts the mandrel 90 and such that the end 92 of the mandrel 90 is aligned with the indexing lines 88. As shown in FIG. 7, the prepreg charge 80 is then heated to a temperature below the curing temperature of the curing resin contained in the prepreg 80 but sufficiently high to allow the warm the resin, allowing the plies of fiber to slip over each other without wrinkling and the flat prepreg to be bent to its desired shape over the mandrel 90. For a shear tie 32 such as in FIGS. 1-3, the charge is heated to between about 130 and 150 degrees Fahrenheit and bent over the drape mandrel 90 along the index lines 88, ensuring that the part thickness is maintained within 0.375" of nominal along its inner radius 55.

Figure 8:
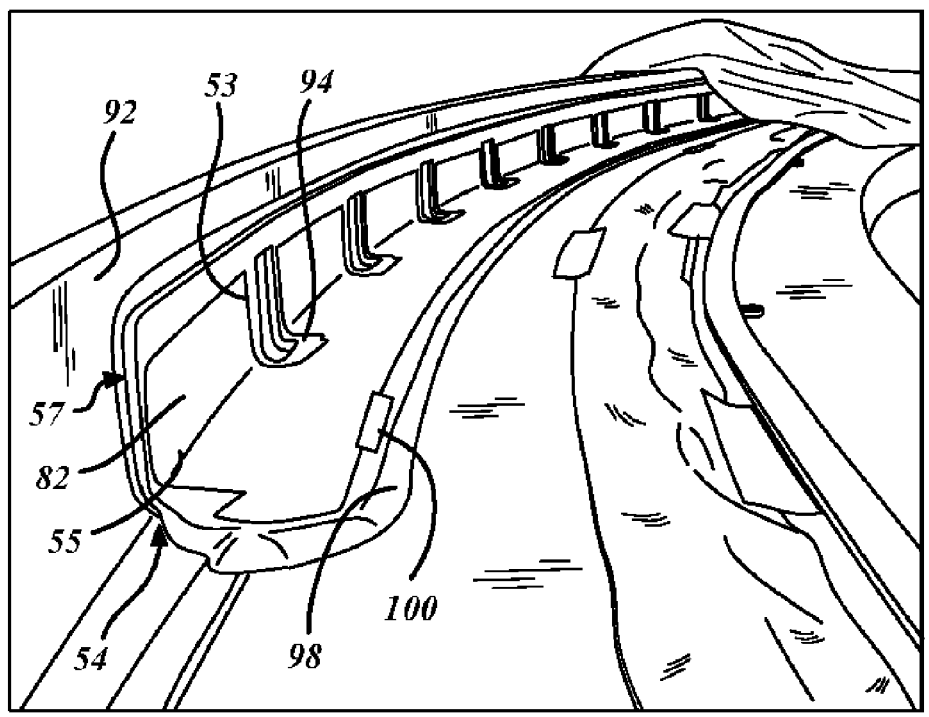

In Step 250, the bent prepreg charge 80 is removed from the drape mandrel 90 and the FEP layers 86 removed. As shown in FIG. 8, the warm bent prepreg charge 80 is placed in a curing tool 92 such that the radius 55 of the bent prepreg material is in intimate contact with the cure tool 92 and such that the outer portions (here outer portions 57, 59, respectively, of the web portion 50 and tabs 52) substantially abuts the curing tool 92 and such that the peel ply layer 82 does not contact the cure tool 92 (i.e. is coupled along the side defining the inner radius 55). The prepreg charge 80 is preferably swept while the part is warm to ensure good contact of the web portion 50 and tabs 52 to the curing tool 92.

In Step 260, an optional resin dam 94 is installed along the outer periphery of the bent charge material 80. For a shear tie 32 as in FIG. 8, the resin dam 94 is installed along the inner bend region 53 of the tabs 52 and around the mousehole region 58. Teflon tape is preferably utilized, taking care to ensure there are no gaps within the tape and minimizing tape bridging, as these bridge areas will fill with resin. Thermocouples (not shown) are preferably installed between the Teflon tape and the charge 80.

Next, in Step 270, as also shown in FIG. 8, an optional chromate resin dam 98 is applied to the top and bottom of the bent prepreg part 80. A second layer of Teflon tape 100 is then installed over the chromate resin dam 98 to avoid sticking to the FEP (shown in FIG. 9 as 104) and/or nylon bag (not shown).

Figure 9:
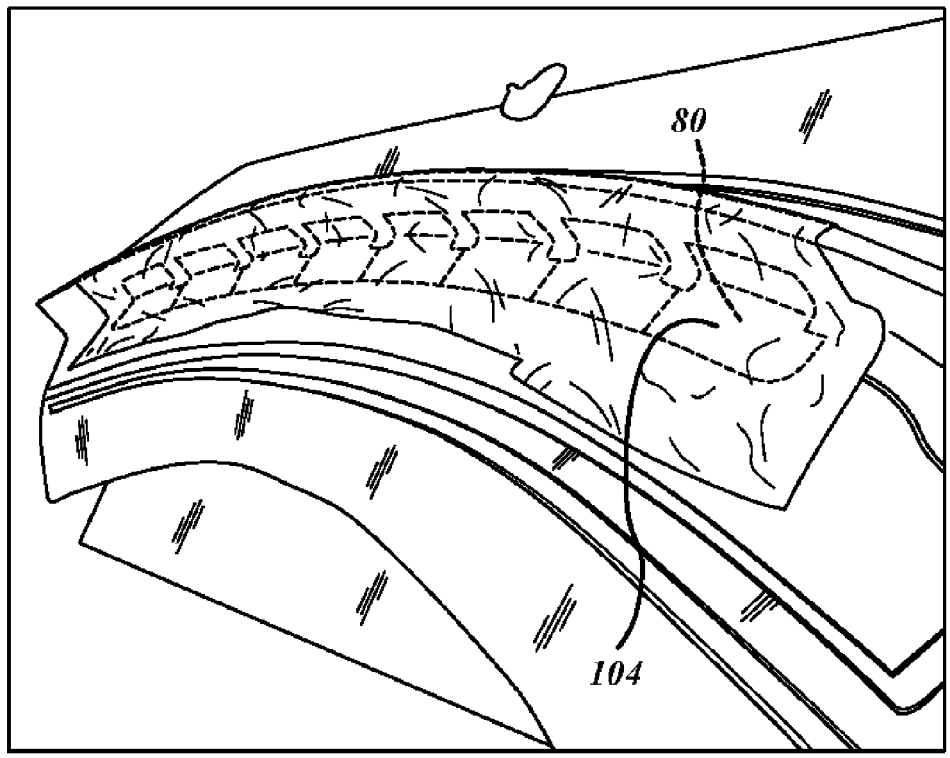

In Step 280, and also as shown in FIG. 9, at least two layers of a 1 mil or 2 mil sheet of FEP 104 are installed over the charge in two pieces with the pieces and overlapping fully one inch along the radius of the part 80 and 2 inches along the outer edges of the part 80. Further, at least one layer of the FEP 104 extends beyond the end of the underlying layer by at least one-half inch.

Figure 10:
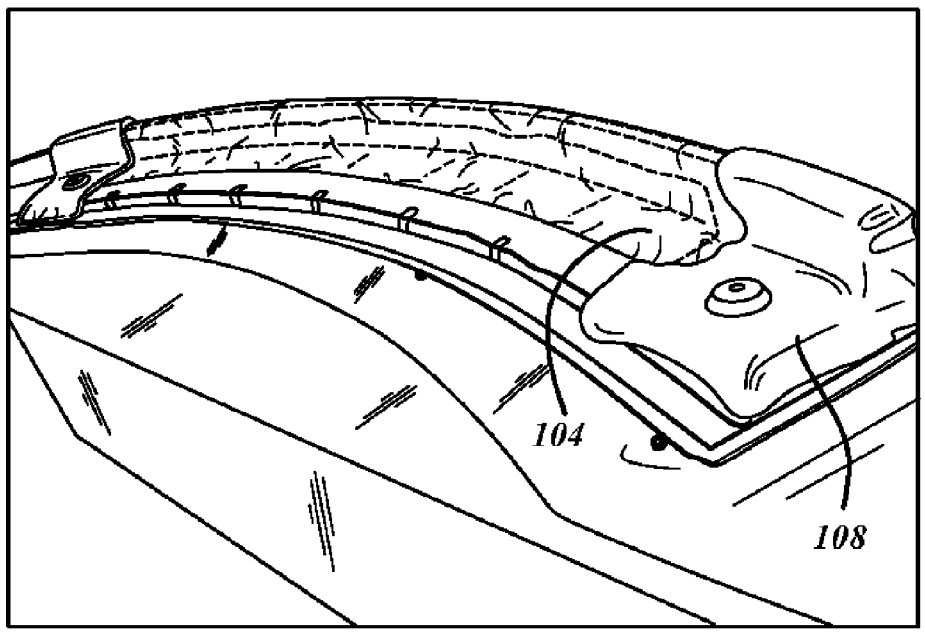

In Step 290, and further shown in FIG. 10, a breather 108 is installed around the part, not to touch the part at any location, offset at least one inch from the part 80. The breather 108 is continuous from one side to the other of the part 80 and around the edges of the part 80.

Figure 11:
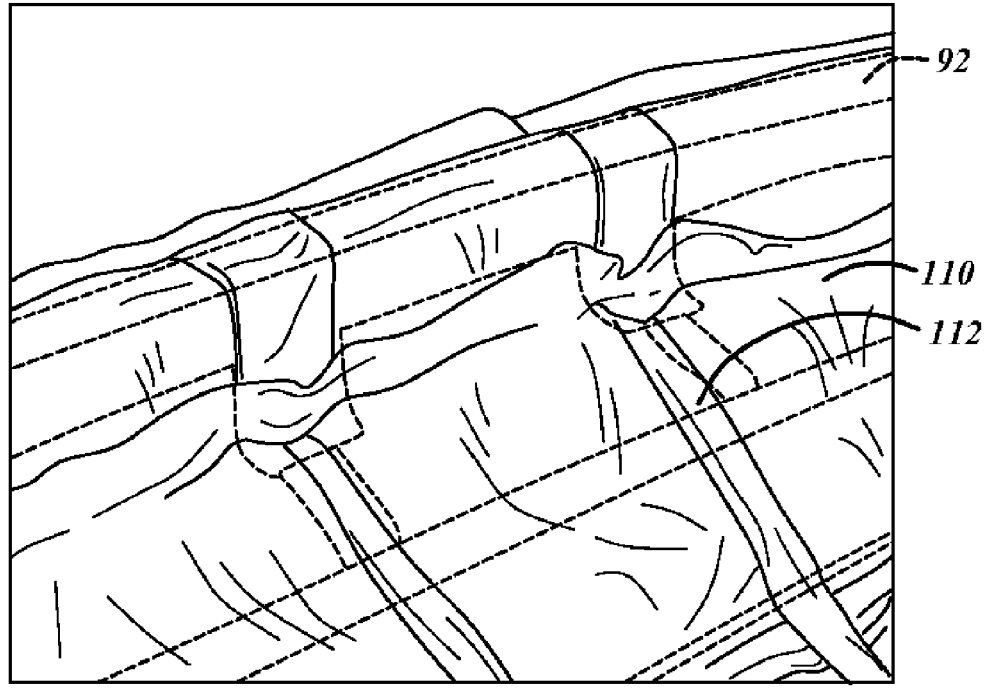
FIGS. 5-11 are perspective views of various manufacturing steps that further illustrate various portions of the logic flow diagram of FIG. 4 as it is used to form the shear tie of FIGS. 2 and 3.
Figure 5:
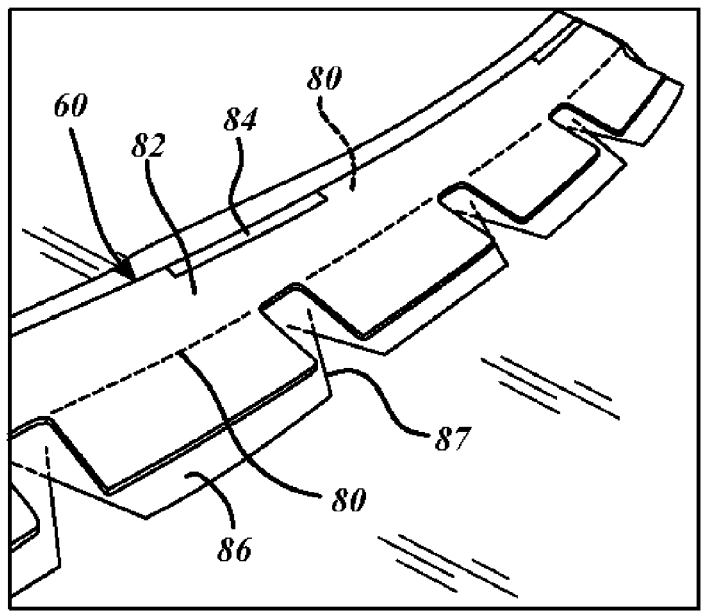

In Step 300, and further shown in FIG. 11, a vacuum bag 110 is installed over the charge 80 and the breather element 108. A pleat 112 is place in the vacuum bag 110 running the length of the radius of the charge. Preferably, for a shear tie 32, the vertical pleats 112 are introduced in the mousehole region 58 of the charge 80. The charge 80 is then ready for autoclaving.

Finally, in Step 310, the charge is cured. For the shear tie of FIGS. 1-3 and 5-11, the charge 80 is cured using an autoclave. However, for other composite parts, an oven or other heating device may be utilized to cure the thermosetting resin component of the charge 80.

For an autoclaving process, the breather material 108 and charge 80 (laminate) consolidate under heat and pressure. By not placing the breather element 108 in direct contact with the charge 80, however, material bridging (bagging and part material) in the inner radius 55 that typically happens from the breather element being pinned against the web portion 50 and flange 52 are eliminated, therein producing a part, here a shear tie 32, with a more consistent thickness throughout its curved and noncurved regions.

The temperature and pressure used in the autoclave, as one of ordinary skill recognizes, is dependent upon the curing characteristics of the curable component used in the charge 80. For a shear tie 32 formed as shown in FIGS. 1-3 and 5-11, utilizing an epoxy prepreg charge 80 having a 350 degree Fahrenheit curing range preimpregnated with carbon fibers, the process begins by first applying a full vacuum of at least 22 inches of Mercury. Next, the autoclave is pressurized to at least 85 pounds per square inch. The autoclave is then ramped up from room temperature to a minimum of 345 degrees Fahrenheit in no more than 5 degrees Fahrenheit per minute increments. The autoclave is then maintained at a minimum of 85 pounds per square inch pressure and a temperature between about 345 and 365 degrees Fahrenheit for about 120 minutes to ensure complete curing of the 350 degree Fahrenheit curing thermosetting epoxy resin. The autoclave is then cooled to about 140 degrees Fahrenheit in no more than 5 degrees Fahrenheit per minute increments prior to releasing the pressure and vacuum. The shear tie 32 is then removed from the autoclave and cooled. The shear tie 32, following further trimming and drilling to final part configuration, is then ready to be introduced within the support structure 24 of the fuselage 15 as described above.

Tests have confirmed that shear ties 32 formed in accordance with the method of FIG. 4 achieve a thickness t1 of the inner radius 55 within +/−10% of nominal, while the thickness t2 of the web region 50 and the thickness t3 of the tab 52 are maintained within +/−6% of nominal.

The present disclosure provides a method of forming a cured composite material having a substantially uniform thickness along the entirety of its curved and noncurved regions with minimal additional steps and without the need for extra hardware. The methods disclosed are robust, in that it can be utilized on composite prepreg materials having substantially varying thicknesses, compositions, and cure characteristics. Composite parts formed by the disclosed methods are formed with more precision than previously available. Also, the composite parts formed according to the disclosed methods are able to be used in applications requiring tight clearances. Further, composite parts having more consistent thickness properties achieve more predictable mechanical properties. Thus, composite parts formed in accordance with this disclosure may be utilized in a wide variety of potential applications, including but not limited to aerospace, automotive, and construction applications.

While several preferred embodiments have been provided, it will be understood, of course, that this disclosure should not be taken as limiting, since modifications may be made by those skilled in the art, particularly in light of the foregoing teachings.

What is claimed is:

1. A method for forming a curved composite laminate part, the method comprising:
   providing a flat prepreg charge including at least one ply of fiber impregnated with an uncured thermosetting resin, said flat prepreg charge having an inner surface and an outer surface;
   applying a peel ply layer to the inner surface of said flat prepreg charge;
   coupling said flat prepreg charge to a drape mandrel such that said peel ply layer contacts said drape mandrel;
   bending said flat prepreg charge over said mandrel to form a bent prepreg charge having a curved inner radius and a pair of outer regions extending from the curved inner radius;
   removing said bent prepreg charge from said drape mandrel;
   then placing said bent prepreg charge onto a female cure tool; and
   curing said bent prepreg material.

2. The method of claim 1, wherein the bent prepreg charge is placed onto the female cure tool such that the outer surface of the bent prepreg charge is in contact with the female cure tool.

3. The method of claim 1, further comprising the steps of:
   applying a first group of one or more layers of FEP to the outer surface of said flat prepreg charge prior to bending, such that said flat prepreg charge is between said peel ply layer and the first group of one or more layers of FEP; and
   removing said first group of one or more layers of FEP after bending.

4. The method of claim 1, further comprising the step of:
applying a first layer of FEP and a second layer of FEP to said inner surface of said bent prepreg charge over said peel ply layer after bending, said first layer of FEP overlapping said second layer of FEP along the curved inner radius, said first and second layer of FEP being in substantial contact with the peel ply layer in the outer regions.

5. The method of claim 1, further comprising the step of:
installing a breather element around an outer periphery of said bent prepreg charge, while ensuring that the space directly around and above the bent prepreg charge is substantially free from breather material.

6. The method of claim 5, wherein the breather element is continuous around the outer periphery of said bent prepreg charge.

7. The method of claim 5, wherein curing said bent prepreg material comprises:
installing a vacuum bag over the bent prepreg charge and the breather element;
introducing said bent prepreg charge to an autoclave;
applying a full vacuum to said vacuum bag;
pressurizing said autoclave to a desired pressure;
heating said autoclave to a curing temperature;
maintaining said autoclave at said curing temperature for a period of time sufficient to substantially cure said uncured resin;
cooling said autoclave to a temperature substantially beneath said curing temperature;
depressurizing said autoclave below said desired pressure; and
releasing said full vacuum.

8. The method of claim 7, further comprising the step of:
placing a pleat in the vacuum bag proximate to and running the length of the curved inner radius.

9. A method for forming a curved composite laminate part, the method comprising:
providing a flat prepreg charge including at least one ply of fiber impregnated with an uncured thermosetting resin;
applying a peel ply layer to a first side of said flat prepreg charge;
coupling a first group of one or more layers of FEP to a second side of said flat prepreg charge;
coupling said flat prepreg charge to a drape mandrel such that said peel ply layer contacts said drape mandrel;
bending said flat prepreg charge over said mandrel to form a bent prepreg charge having a curved radius and a pair of outer regions extending from the curved radius;
removing said first group of one or more layers of FEP;
removing said bent prepreg charge from said drape mandrel;
then placing said bent prepreg charge onto a female cure tool such that the bent prepreg charge is in substantial contact with the female cure tool;
applying a second group of one or more layers of FEP to said first side of said bent prepreg charge, said second group being applied over said peel ply layer, said second group consisting of a first layer of FEP and a second layer of FEP, said first layer overlapping said second layer within the curved radius, both layers of FEP being in substantial contact with the peel ply layer in the outer regions;
coupling a breather element around an outer periphery of said bent prepreg charge, while ensuring that the space directly around and above the bent prepreg charge is substantially free from breather material; and
curing said bent prepreg material.

10. The method of claim 9, wherein said uncured thermosetting resin comprises a thermosetting epoxy resin.

11. The method of claim 10, wherein said thermosetting epoxy resin comprises a 350-degree Fahrenheit curable thermosetting epoxy resin.

12. The method of claim 9, wherein said fiber is selected from the group consisting of carbon fiber and a glass fiber.

13. The method of claim 12, wherein said glass fiber is selected from the group consisting of e-type glass and s-type glass.

14. The method of claim 9, wherein curing said bent prepreg material comprises:
installing a vacuum bag over the bent prepreg charge and the breather element;
introducing said bent prepreg charge to an autoclave;
applying a full vacuum to said vacuum bag;
pressurizing said autoclave to a desired pressure;
heating said autoclave to a curing temperature;
maintaining said autoclave at said curing temperature for a period of time sufficient to substantially cure said uncured resin;
cooling said autoclave to a temperature substantially beneath said curing temperature;
depressurizing said autoclave below said desired pressure; and
releasing said full vacuum.

15. A method for forming a curved composite laminate part with substantially uniform thickness in curved and non-curved regions of the part, the method comprising:
providing a bent prepreg charge having a curved inner radius and a pair of outer regions extending from said curved inner radius, said bent prepreg charge including at least one ply of fiber impregnated with an uncured thermosetting resin, said bent prepreg charge having a layer of peel ply being in substantial contact with an inner surface of the at least one ply of fiber;
placing said bent prepreg charge on a female cure tool such that said peel ply layer does not contact said female cure tool;
applying a first layer of FEP and a second layer of FEP over said bent prepreg charge, said first layer of FEP fully overlapping said second layer of FEP along the curved inner radius of the bent prepreg charge, both layers of FEP being in substantial contact with the peel ply layer in the outer regions;
coupling a breather element around an outer periphery of said bent prepreg charge, while ensuring that the space directly around and above the bent prepreg charge is substantially free from breather material; and
curing said bent prepreg material.

16. The method of claim 15, wherein said uncured thermosetting resin comprises a thermosetting epoxy resin.

17. The method of claim 16, wherein said thermosetting epoxy resin comprises a 350 degree Fahrenheit curable thermosetting epoxy resin.

18. The method of claim 15, wherein said at least one fiber is selected from the group consisting of carbon fiber material and glass fiber material.

19. The method of claim 18, wherein said glass fiber is selected from the group consisting of e-type glass and s-type glass.

20. The method of claim 15, wherein the breather element is continuous around the outer periphery of said bent prepreg charge.

21. The method of claim 15, wherein curing said bent prepreg material comprises:
- installing a vacuum bag over the bent prepreg charge and the breather element;
- introducing said bent prepreg charge to an autoclave;
- applying a full vacuum to said vacuum bag;
- pressurizing said autoclave to a desired pressure;
- heating said autoclave to a curing temperature;
- maintaining said autoclave at said curing temperature for a period of time sufficient to substantially cure said uncured resin;
- cooling said autoclave to a temperature substantially beneath said curing temperature;
- depressurizing said autoclave below said desired pressure; and
- releasing said full vacuum.

22. The method of claim 21, further comprising the step of:
- placing a pleat in the vacuum bag proximate to and running the length of the curved inner radius.

* * * * *